US008589401B2

(12) United States Patent
Berger

(10) Patent No.: US 8,589,401 B2
(45) Date of Patent: *Nov. 19, 2013

(54) METHOD FOR RESPONDING TO A PLURALITY OF ELECTRONIC MESSAGES

(71) Applicant: Isentium Technologies Inc., Montreal (CA)

(72) Inventor: Olivier Berger, Toronto (CA)

(73) Assignee: Isentium Technologies Inc., Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,682

(22) Filed: Mar. 12, 2013

(65) Prior Publication Data

US 2013/0246542 A1 Sep. 19, 2013

Related U.S. Application Data

(63) Continuation of application No. 12/816,949, filed on Jun. 16, 2010, now Pat. No. 8,417,706.

(60) Provisional application No. 61/187,518, filed on Jun. 16, 2009.

(51) Int. Cl.
*G06F 7/00* (2006.01)
*G06F 17/30* (2006.01)

(52) U.S. Cl.
USPC ........................................................ 707/740

(58) Field of Classification Search
None
See application file for complete search history.

(56) References Cited

U.S. PATENT DOCUMENTS

| 6,950,814 | B2 | 9/2005 | Bergan et al. |
| 7,095,975 | B2 | 8/2006 | Shirai et al. |
| 2008/0201632 | A1 | 8/2008 | Hong et al. |
| 2009/0109862 | A1 | 4/2009 | Capello et al. |
| 2009/0109872 | A1* | 4/2009 | Skubacz et al. ............... 370/254 |
| 2011/0066973 | A1 | 3/2011 | Plom et al. |

OTHER PUBLICATIONS

DanRaisch, et al., Batch reply Apr. 1, 2009, mozillaZine, http://forums.mozillazine.org/viewtopic.php?f=39&t=1176715.
Mail Tweak: Tweaks Apr. 26, 2009 [accessed archive.org on Nov. 30, 2012], mozdev.org, archive.org screen capture: http://web.archive.org/web/20090427025642/htt;://mailtweak.mozdev.org.
Montgomery et al., Getting Started with Tunderbird 2/0: For Macintosh OS X Jun. 7, University of Hawaii Informaiton Technology Services, 27 pgs.
Mail Tweak: Screenshots Mar. 28, 2009 [accessed archive.org on Nov. 30, 2012], mozdev.org, archive.org screen capture: http://web.archive.org/web/20090422130657/http://mailtweak.mozd.
Rules of Practice Before the Board of Patent Appeals and Interferences in Ex Parte Appeals; Final Rules Jun 10, 2008, 73 Fed Reg. 112, 32938-32977.

(Continued)

*Primary Examiner* — Jason Liao
(74) *Attorney, Agent, or Firm* — Welsh Flaxman & Gitler LLC

(57) ABSTRACT

A method is disclosed for acting on a plurality of electronic messages. The method includes the step of receiving the plurality of electronic messages. Each of the plurality of electronic messages is then portioned into a plurality of message components. Each of the plurality of message components is then grouped into common-themed sets. Once grouped, the method allows the viewing of one of the common-themed sets to determine an appropriate response to each of the plurality of messages having one of the plurality of message components grouped in the common-themed set.

9 Claims, 7 Drawing Sheets

(56) References Cited

OTHER PUBLICATIONS

Rules of Practice Before hte Board of Patent Appeals and Interferences in Ex Parte Appeals Jul. 30, 2007, 72 Fed. Reg. 145, 41475-41490.

Aba et al., Comments on Jul. 2007 Rules of Practice Before the Board of Patent Appeals and Interferences in Ex Parte Appeals, on or before Oct. 15, 2007, http://www.uspto.gov/ip/r.

United States Congress, Administrative Procedure Act 1946, National Archives, Subchapter II Sections 552a, 553.

* cited by examiner

US 8,589,401 B2

METHOD FOR RESPONDING TO A PLURALITY OF ELECTRONIC MESSAGES

CROSS REFERENCE TO RELATED APPLICATIONS

The present application is a continuation of U.S. patent application Ser. No. 12/816,949 filed on Jun. 16, 2010, which is currently pending, which claims the benefit of U.S. Provisional Patent Application 61/187,518, filed Jun. 16, 2009.

BACKGROUND ART

1. Field of the Invention

The invention relates to method for responding to a plurality of messages in a concise manner. More particularly, the invention relates to a method of partitioning portions of messages to group those portions similarly to ease the task of preparing responses thereto.

2. Description of the Related Art

Social networking is a new name for an age-old process of becoming acquainted with and maintaining relationships with others. The internet has taken hold of social networking and has created models by which individuals may be able to stay abreast of the activities performed by those within one's network or may provide an easy way to inform those in one's network that activities have occurred.

Currently, there are two types of models by which one could maintain an electronic social network on the internet. The first model is akin to a Facebook® model where a user has a webpage and uploads photos and activities thereon. Those that want to become a part of that network may view the activities, the photographs and comment thereon. The second model of electronic social networking includes the use of short messages that are broadcast out over the internet to those that have identified themselves as having an interest of activities of a particular person, group or entity. An example of this model is employed by a service operating under the trademark Twitter®.

One of the advantages of having electronic social network platforms by which to communicate with others includes the ability and ease to communicate with many people at one time. This advantage is also a disadvantage in that these electronic social network platforms also provide an easy platform for those in your network to respond and comment on certain events. A user of electronic social networking platforms can become inundated with communications from those inside one's network. The shear volume of messages being sent to a user can prevent that user from adequately responding to those messages should that user desire to do so.

SUMMARY OF THE INVENTION

A method is disclosed for acting on a plurality of electronic messages. The method includes the step of receiving the plurality of electronic messages. Each of the plurality of electronic messages is then portioned into a plurality of message components. Each of the plurality of message components is then grouped into common-themed sets. Once grouped, the method allows the viewing of one of the common-themed sets to determine an appropriate response to each of the plurality of messages having one of the plurality of message components grouped in the common-themed set.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
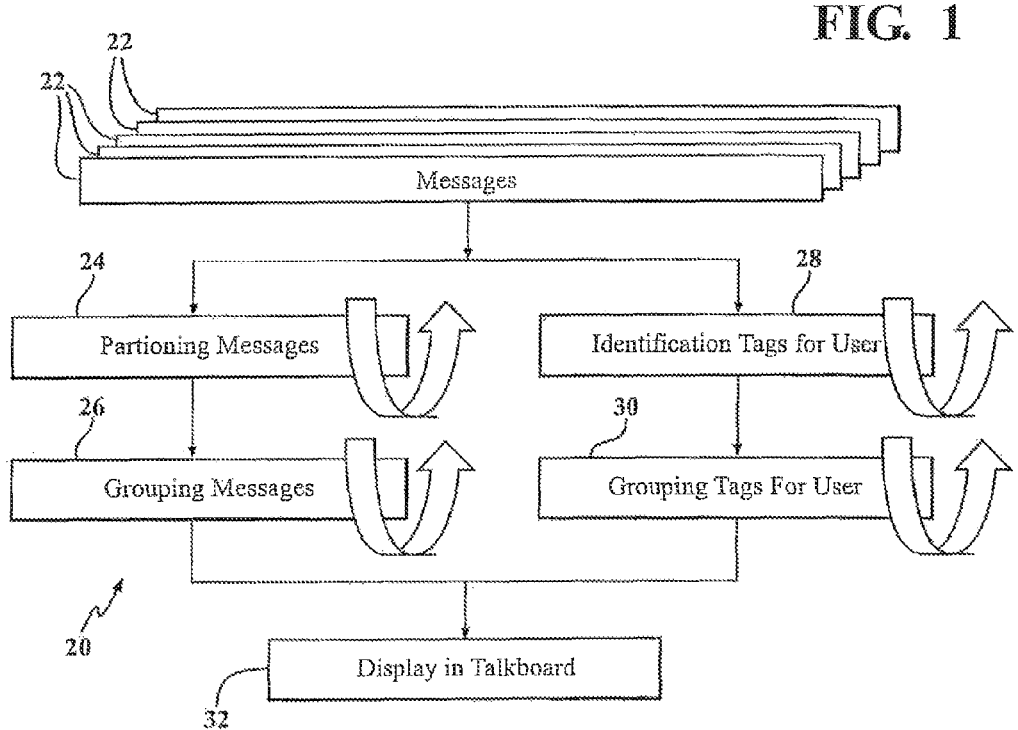
FIG. 1 is a schematic logic chart representing one embodiment of the invention.

Referring to FIG. 1, the inventive method is generally indicated at 20. The inventive method provides a means for grouping messages such that a user of the inventive method 20 will be able to respond to groups of messages with a single appropriate message as opposed to individual messages should the user so choose.

The inventive method begins by receiving a plurality of messages 22. The messages are partitioned at 24. Once the messages are partitioned, they are grouped at 26.

Concurrently with the steps of partitioning 24 and grouping 26, identification tags for users are created at 28. Tags for individual users are then grouped at 30. Once the messages and the identification tags are grouped, the results are displayed for viewing at 32. The viewing of the displayed information will be discussed in greater detail subsequently.

Figure 2:
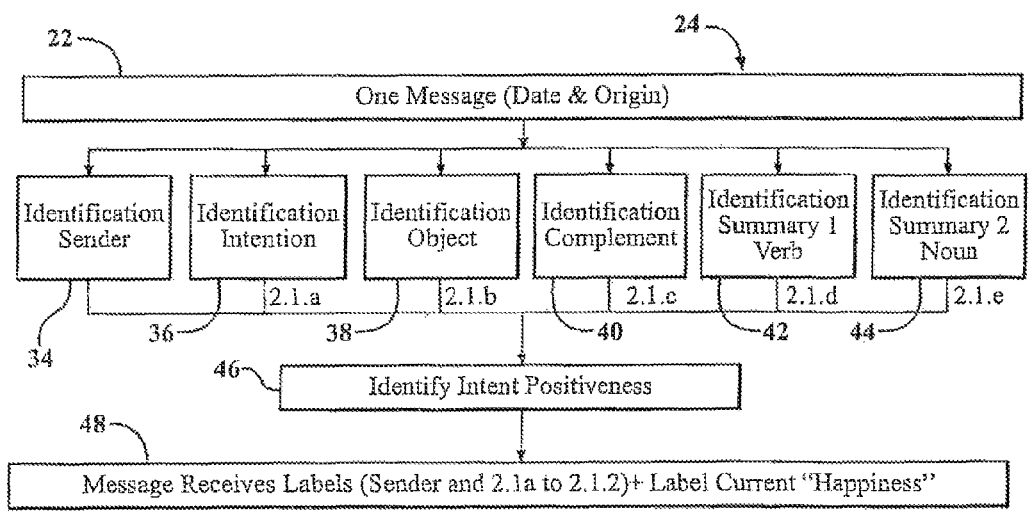
FIG. 2 is a schematic logic chart representing the partition portion of the inventive method.

Referring to FIG. 2, the partitioning step 24 is generally indicated. The message 22, including information regarding the date and origin of the message, is partitioned into several different fields and the information from that message is collected at that time. These different fields 34-42, sometimes referred to as "buckets," are used to collect information similar in one fashion or another. The groupings include the sender's identification 34, the intention identification 36, the object identification 38, the complement identification 40, the verb identification 42 and the noun identification 44. It should be appreciated by those skilled in the art that other types of identifications of parts of a message 22 may be included or replace those that are set forth herein.

An overall intent positiveness identification is performed at 46. To identify an intention is to identify the intention of the user in writing a message. The method categorizes the intentions into five categories: (1) expression of a positive opinion, (2) expression of a negative opinion; (3) expression of a suggestion/recommendation; (4) expression of a question to get an answer; or (5) to share something about me or about what the author knows/heard. For each of the 5 different intention, variants within those intentions are also identified (all different variants for (1) to (5) for instance for (1) it goes from liking to loving to agreeing, and the like). Therefore, this categorization of intention is a two step process. Once all of this is completed, the message 22 receives the labels at 48.

Therefore, the process of partitioning messages 24 includes receiving a message and identifying and labeling parts to that message to create a composite message used for the step of grouping.

Figure 3:
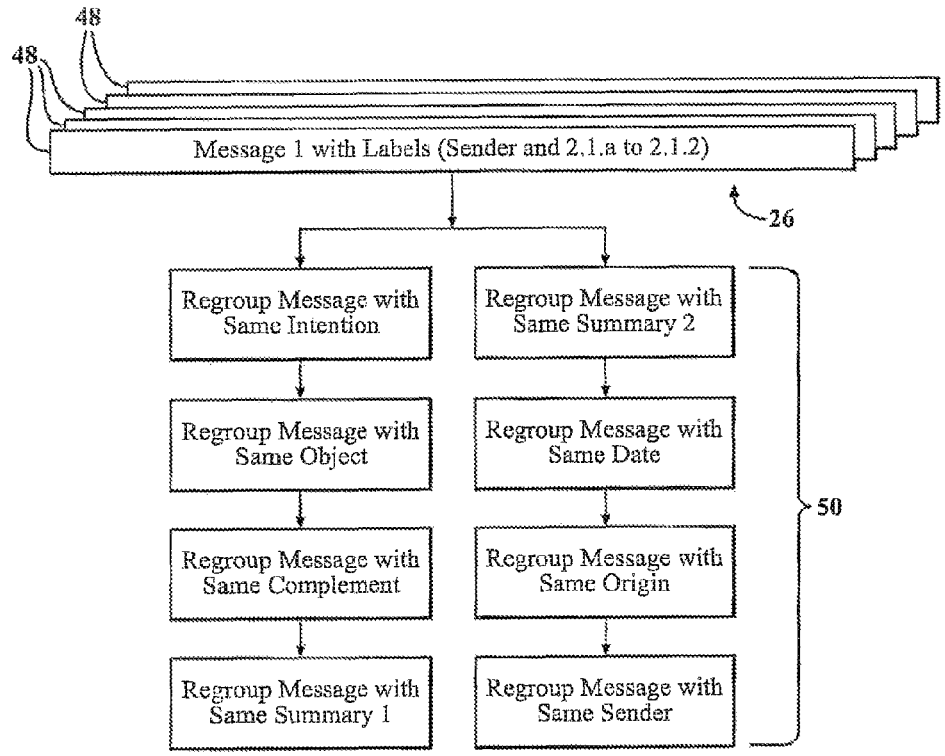
FIG. 3 is a schematic logic chart of the grouping process of the inventive method.

Referring to FIG. 3, the grouping process 26 is shown in greater detail. The grouping of messages begins by collecting the composite messages 48. The composite messages 48 were created in the partitioning step 24 discussed above in detail in FIG. 2. The composite messages 48 are grouped at 50, which graphically represents similar intentions, objects, complements, and the like.

Figure 4:
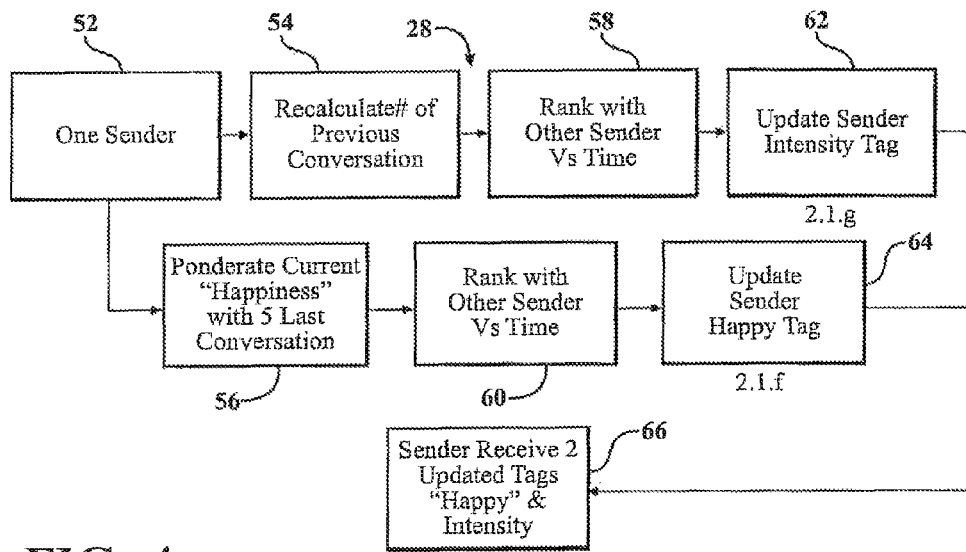
FIG. 4 is a schematic logic chart of an identification process for one center utilizing the inventive method.

Referring to FIG. 4, a detailed method for performing the step of identifying tags for a user 28 is generally indicated. This step begins by identifying a sender of messages at 52. The method retrieves a number of previous conversations and recalculates them at 54. The step of recalculation of previous conversations includes the repartitioning and regrouping of those particular messages sent by the identified sender. Recalculation is the ranking of the user's number of conversations with other users to define three tiers: high intensity, average intensity and lowest intensity. This is recalculated dynamically based on which conversations are selected through the navigation talkboard, discussed in greater detail below. At the same time, the method identifies the current "happiness" quotient of the last five conversations at 56. The recalculation of the previous conversations at 54 and the ponderation of the "happiness" quotient is then compared to the last five conversation from the same user. This is done to simulate how human memory is working, i.e., the most recent conversations have a higher impression than the previous ones. This process is recalculated dynamically based on which conversations are selected through the navigation talkboard, discussed below.

Figure 5:
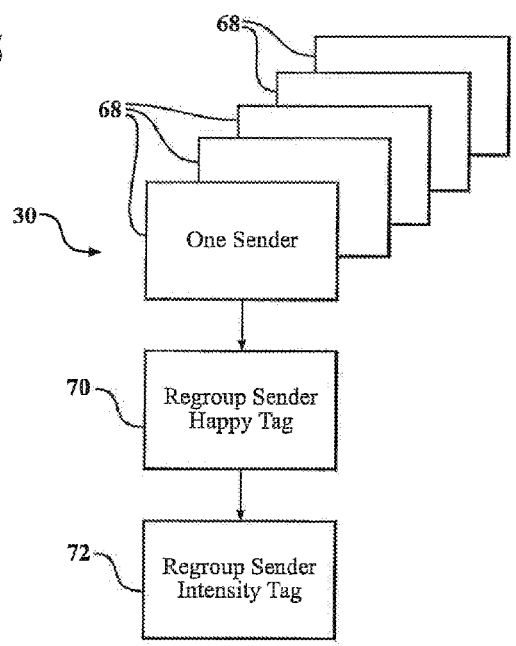
FIG. 5 is a schematic logic chart of the grouping process for one center utilizing the inventive method.
Figure 6:
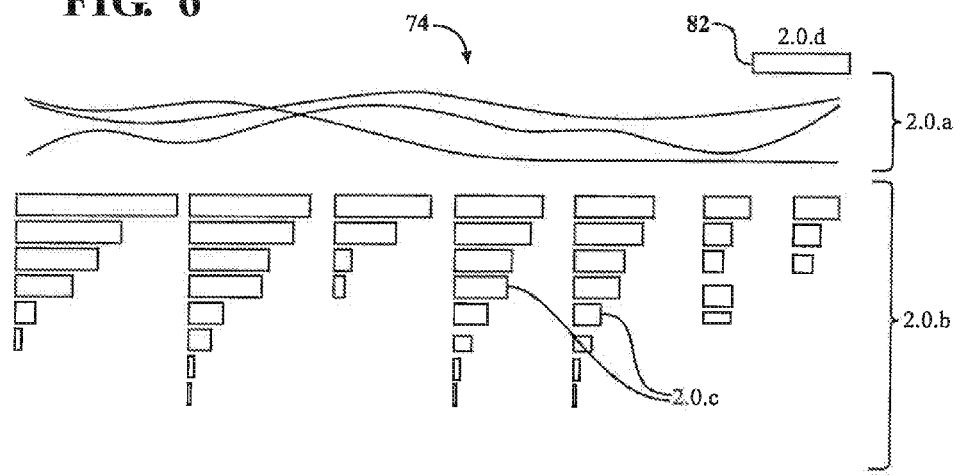
FIGS. 6 through 10 represent various schematic output screens that a user of the inventive method may employ to view one or more electronic messages.
Figure 7:
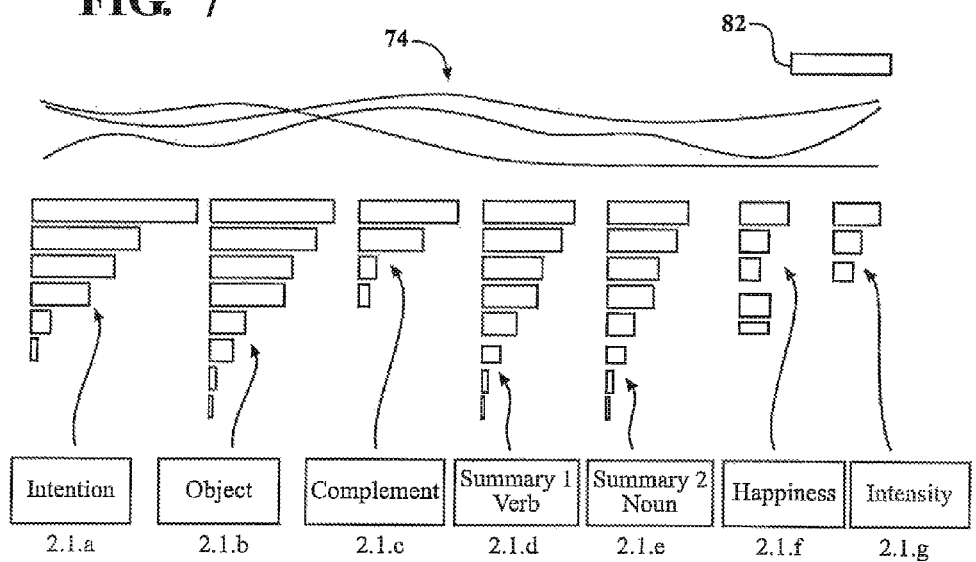
Figure 8:
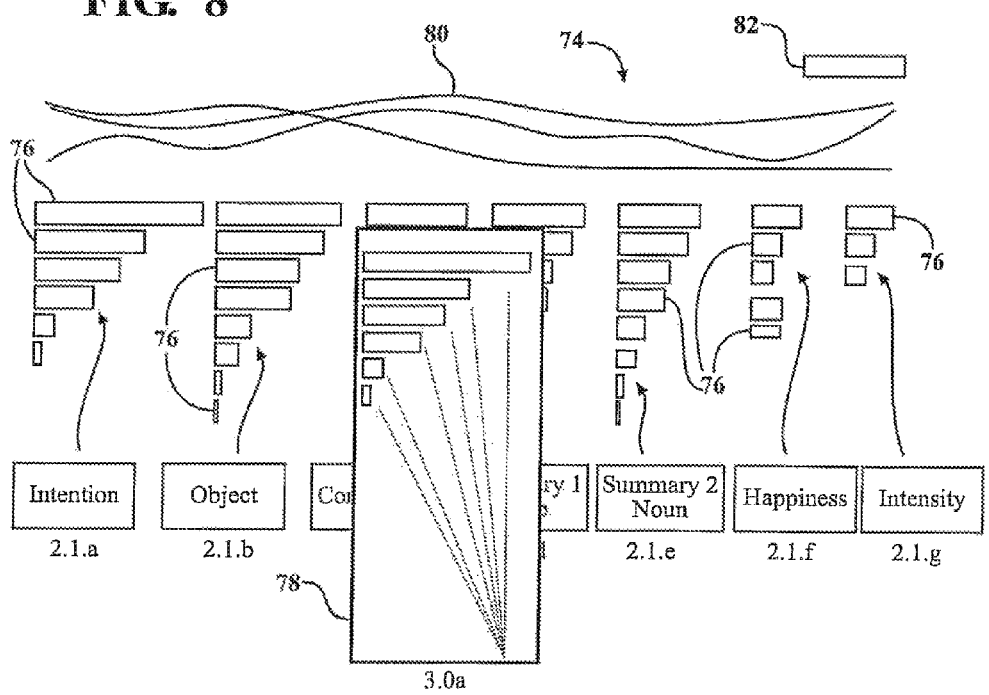
Figure 9:
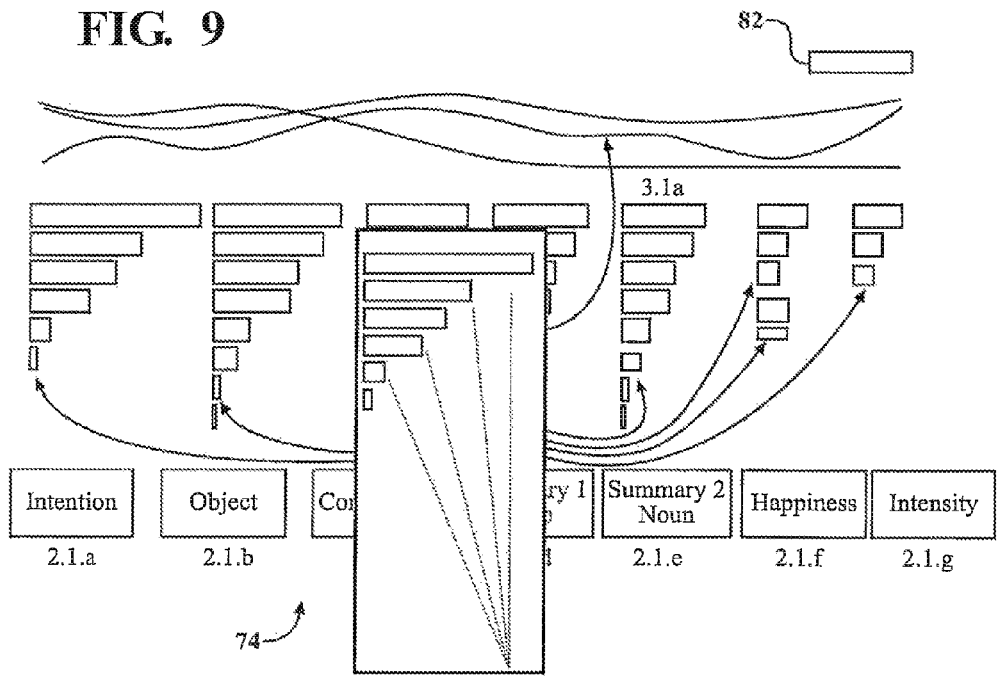

Referring to FIG. 5, the step of grouping tags for users 30 is shown in more detail. Each of the composite senders 68 represents a sender's information that has been updated and compiled at 66, discussed above. The senders are then regrouped based on, for example, happiness at 70 and intensity at 72.

Referring to FIGS. 6 through 10, examples of how the partitioned and grouped messages may be displayed is shown. These displays shall hereinafter be referred to as talkboards 74. The talkboards 74 include various bars 76 that represent a percentile relating to a particular grouping. More specifically, the larger the bar 76 the more senders of messages incorporated a particular feature in their respective messages. From left to right as depicted in the Figures, each bar 76 in the first column (left-most column) represent a group of people that expressed a similar intention in their message and their variant associated therewith (variants of positive opinions, variants of negative opinion, suggestion/recommendation, question, sharing). Each bar 76 in the second column represents people who had the same subject of discussion, i.e., the same object of their intention. Each bar 76 in the third column represents a group of people that gave an explanation, a contradiction, a question or another idea following the intention they expressed. Each bar 76 in the fourth and fifth columns represents a group of people with the same explanation or contradiction or question or expression of a second idea. In a sense, from left to right, the message in a particular sentence is cut into pieces and rebuilt in a categorized database graphically represented by the bars 76. By way of example, the first column of bars 76 includes several senders that have expressed that they like something whereas another group have expressed that they ask for something. These two sets of messages would be grouped in separate bars allowing the user of the inventive method 20 to choose to respond to those who expressed that they "like" something or to those who asked for something.

The various columns of bars 76 represent the types of groupings that have occurred for the messages received by the user of the inventive method 20. A user may choose to select an individual bar 76 to respond to that particular grouping of messages. Or, in the alternative, as is represented by insert graphic 78, a user may choose to select two or more bars 76 in a column of bars 76. As you select more bars in a column, it adds conversations that are selected. As an illustration, in column 2, if you had the following bar 76: coffee-latte, water-bottle, employees. If you select coffee-latte and water-bottle, the system will select all conversations that are talking about coffee-latte and water-bottle in the message.

Figure 10:
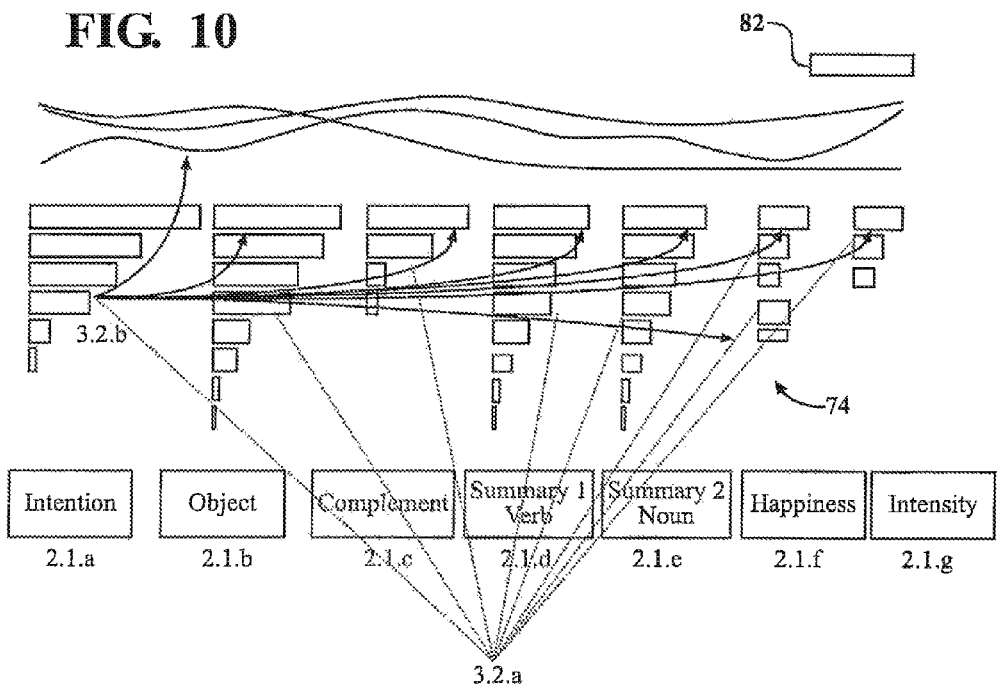
Figure 11:
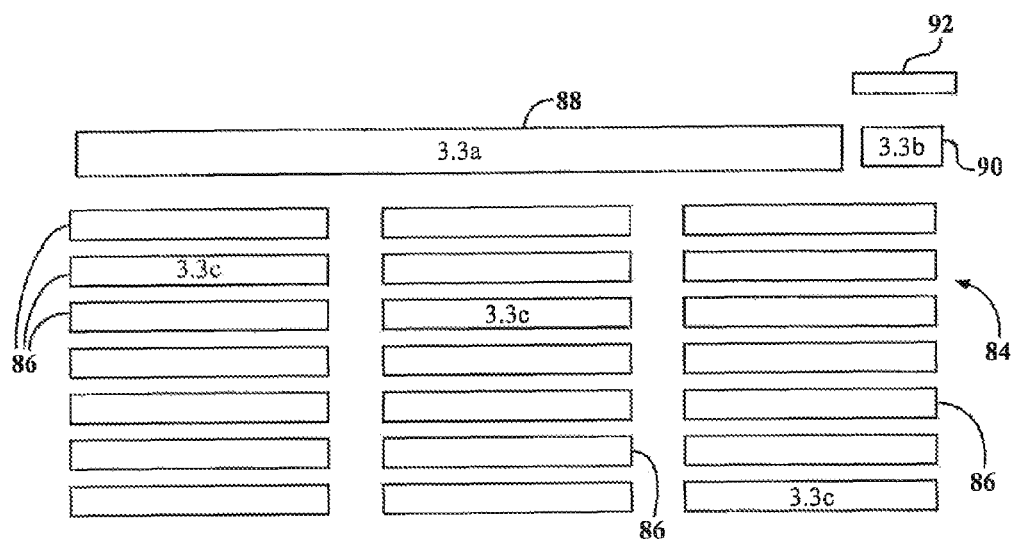
FIG. 11 is one example of a screen display designed to facilitate response to multiple recipients.

As you select one or more bars in a column all the other bars in every columns will be updated to represent the conversions. As seen in FIG. 10 for illustrative purposes, if you were to select in the second column, the bar 76 related to "coffee-latte" and the bar 76 related to "water-bottle," the user will be able to view in the first column all intentions (bars) related to bar coffee-latte and the bar water-bottle as well as in third column all bars representing if those groups of people gave an explanation, contradiction, etc. Further, the authors' given explanations and contradictions and the like can be viewed in the fourth and fifth columns. Additional selections of conversations may occur by choosing one or more bars in the other columns.

A timeline navigation bar 80 is updated based on the selections of bars 76 that are chosen for an action to occur. Actions that may occur includes responding to the message or group of messages or deletion of the group of messages or flagging those groups of messages for later response. Those skilled in the art may appreciate that other actions may be deemed appropriate once a selection occurs. The timeline navigation enables users:

(1) to visualize trends as messages represented under the 5 main categories—positive opinion, negative opinion, suggestion/recommendation, question, sharing (one can compare and see trends based on the bar selected below);

(2) to select the period of time where the conversations happened (as an illustration, if you were graphically selecting to see conversations from date 1 and update 2, instantly, all the bars below will be updated to represent the exact conversations that happened during this period of time); and (3) to select conversations as you click on the graph representing positive opinion, negative opinion, suggestion/recommendation, question, sharing (then all the bars 76 will update to represent the selection).

At the top of the screen is an action button 82. Once a bar or set of bars 76 is selected for an action, the user may select or press the action button 82 allowing the user of the inventive method to respond in some way to the plurality of messages represented by the bar or bars 76 selected. Once selected, an action screen, generally indicated at 84, is displayed. The action screen identifies at 86 each of the messages that have been selected by clicking on one or more bars 76 in the talkboard 74 screen. This action screen includes a response window 88 that allows the user to type in a response that may be sent to each of the plurality of messages 86. A send button 90 allows the user to send the message created in the response window 88 to each of the senders of the plurality of messages 86. A return button 92 may be selected allowing the user to return to the talkboard screen 74 for further review and filtering.

Figure 12:
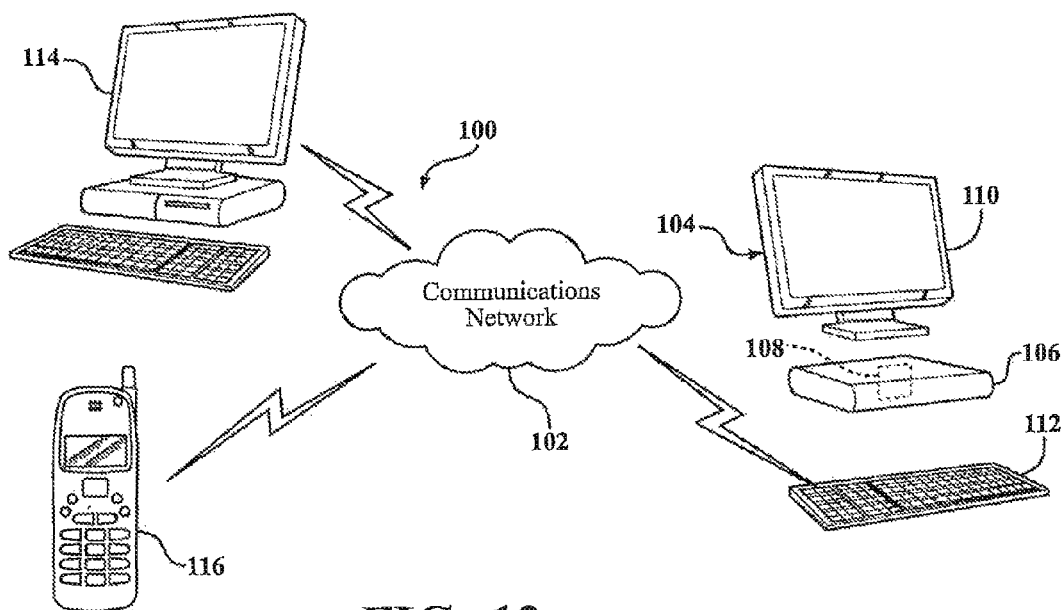
FIG. 12 is a schematic view of a communications network interacting with an electronic device incorporating the method and other electronic devices.

Referring to FIG. 12, a network of electronic devices is generally indicated at 100. The network 100 includes a communication network 102, graphically represented by a cloud.

The communications network 102 may include standard wired networks, satellite networks, wired networks and wireless networks. An electronic device generally shown at 104 is a device that utilizes the inventive method. The electronic device 104 is graphically shown having separate or disparate elements for purposes of simplicity. It should be appreciated by those skilled in the art that the electronic device 104 may be any type of computing device from a "smartphone" to a laptop computer to a server. The electronic device 104 includes a controller 106 having a memory unit 108, a display 110 and an input device 112 all electronically connected via conductors 113. The display 110 is shown to be a monitor although it could be any other type of display device. In addition, the input device 112 is shown to be a standard keyboard. The input device 112 may be a speaker if the control unit 106 includes dictation/transcription software. In other words, the input and the display of the information may be done by whichever means is appropriate for the electronic device 104 and the user that is operating the electronic device 104. The electronic device 104 is connected to the communications network 102 and is capable of receiving and transmitting communications and other electronic devices, graphically represented by a computer 114 and a mobile phone 116 and any other devices that are designed to communicate with other electronic devices through a communications network 102.

Figure 13:
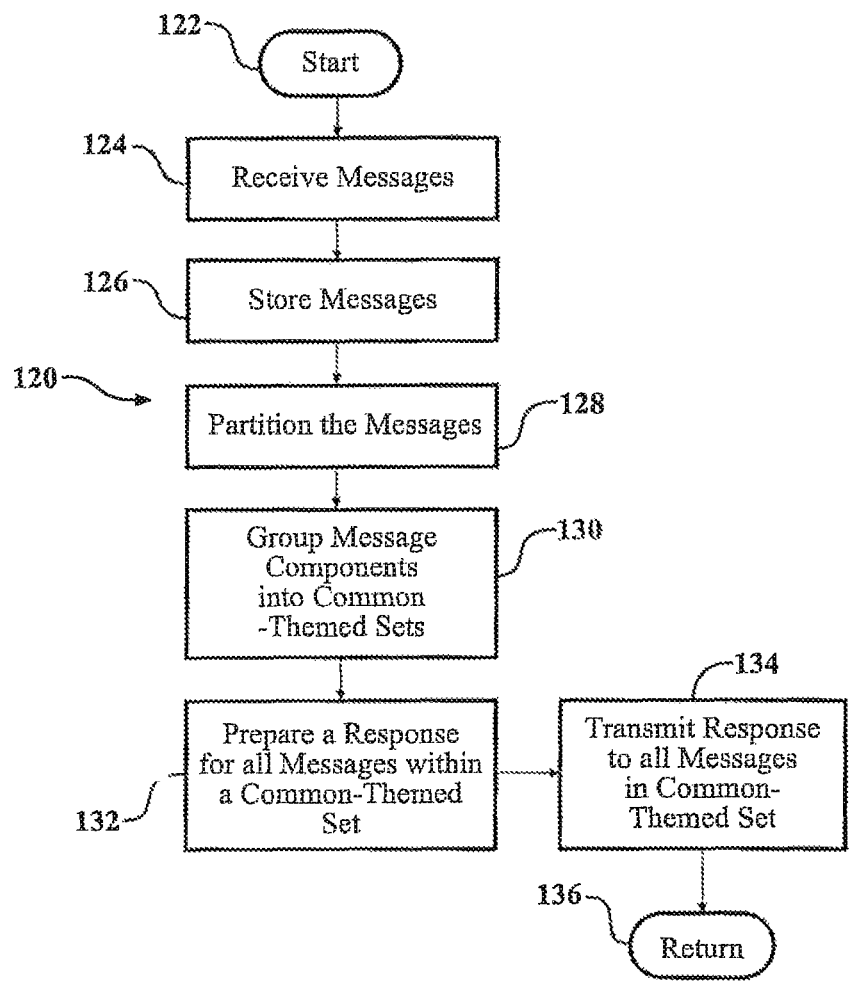
FIG. 13 is a logic diagram of one method of the preferred embodiment.

Referring to FIG. 13, one embodiment of the inventive method is graphically illustrated at 120. The method begins at 122. The electronic device 104 receives messages at 124. Those messages are stored 126 in the memory 108. The control unit 106 partitions the messages at 128. The partitioning of the messages divides the messages, as is discussed in greater detail above, into segments having similar elements. The messages are grouped based on their components having common-theme sets. This is done at 130. All of the messages that include the common-themed portion of a message may be viewed at the same time to determine a response for the plurality of messages that are grouped together. A single response is prepared at 132. This response is for all of the messages that have an element that have been grouped in a common-themed set based on the partitioning thereof. The electronic devices 104 then transmits through the communications network to other electronic devices 114, 116 a response to all of the messages that had a component grouped in a common-themed set. This step occurs at 134. Once the message has been transmitted, the method returns at 136 to allow the messages to be regrouped or have additional analysis on those or other messages.

This method maybe iterative in that after the messages are partitioned and grouped into common-theme sets, multiple passes of the analysis may occur to determine which messages have more than one component that is in a common-themed set. More specifically, if a group of messages have three components all of which are grouped into their respective common-themed sets and all three components are parts of all three messages, the multi-stepped analysis may allow a user to identify this set of messages that has multiple components that are commonly shared. In this situation, a more detailed response including all three components may be prepared.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A method for acting on a plurality of electronic messages in an electronic device so as to visualize trends and respond to electronic messages grouped in common-themed sets, the method comprising the steps of:
   receiving a plurality of electronic messages from electronic devices;
   creating a composite message, the step of creating a composite message including partitioning each of the plurality of electronic messages into plurality of message components and identifying an intention of each of the plurality of message components and labeling each of the plurality of message components to create the composite message;
   grouping the plurality of electronic messages in the form of composite messages into common-themed set groupings composed of composite messages having similar message components;
   displaying the common-themed set groupings to visualize trends in the form of a graph;
   selecting one of the common-themed set groupings being displayed;
   determining an appropriate response to each of the plurality of electronic messages grouped in the common-themed set grouping that has been selected and responding to each sender of the plurality of electronic messages in the common-themed set grouping by sending an electronic message through a communication network to the electronic devices.

2. A method as set forth in claim 1 wherein the step of responding includes preparing a single response for all of the plurality of electronic messages in the common-themed set grouping.

3. A method as set forth in claim 1 wherein the step of responding includes preparing a single response for each of the plurality of electronic messages in the common-themed set grouping.

4. A method as set forth in claim 1 wherein the step of partitioning includes separating each of the plurality of electronic messages by intention.

5. A method as set forth in claim 1 wherein the step of partitioning includes separating each of the plurality of electronic messages by an object in a sentence.

6. A method as set forth in claim 1wherein the step of partitioning includes separating each of the plurality of electronic messages by whether an explanation, contradiction, question and another idea is given in a sentence.

7. A method as set forth in claim 1 wherein the step of partitioning includes separating each of the plurality of electronic messages by a verb/noun in a sentence that represent the explanation, contradiction, question and other idea in the sentence.

8. A method as set forth in claim 7 wherein the step of partitioning includes separating each of the plurality of messages components by another verb/noun in a sentence that represent the explanation, contradiction, question other idea in the sentence.

9. A method as set forth in claim 1 wherein the step of partitioning includes separating each of the plurality of electronic messages by identification of sender.

* * * * *